US007071642B2

(12) United States Patent
Wilton et al.

(10) Patent No.: US 7,071,642 B2
(45) Date of Patent: Jul. 4, 2006

(54) METHOD AND APPARATUS FOR ADAPTIVE CONTROL OF TRACTION DRIVE UNITS IN A HYBRID VEHICLE

(75) Inventors: Thomas F. Wilton, Centennial, CO (US); Joshua J. Anderson, Edgewater, CO (US); Robert W. Schmitz, Littleton, CO (US)

(73) Assignee: Transportation Techniques, LLC, Denver, CO (US)

( * ) Notice: Subject to any disclaimer, the term of this patent is extended or adjusted under 35 U.S.C. 154(b) by 233 days.

(21) Appl. No.: 10/795,339

(22) Filed: Mar. 9, 2004
(Under 37 CFR 1.47)

(65) Prior Publication Data

US 2004/0207348 A1 Oct. 21, 2004

Related U.S. Application Data

(63) Continuation-in-part of application No. 10/413,544, filed on Apr. 15, 2003, now abandoned, which is a continuation-in-part of application No. 09/748,182, filed on Dec. 27, 2000, now Pat. No. 6,573,675.

(51) Int. Cl.
| | |
|---|---|
| *H02P 1/00* | (2006.01) |
| *H02P 1/22* | (2006.01) |
| *H02P 1/40* | (2006.01) |
| *H02P 3/00* | (2006.01) |
| *H02P 3/20* | (2006.01) |

(52) U.S. Cl. ............... 318/268; 180/65.1; 180/65.2; 180/65.3; 180/65.4; 180/65.5; 180/65.8; 180/197

(58) Field of Classification Search ............ None
See application file for complete search history.

(56) References Cited

U.S. PATENT DOCUMENTS

| 4,187,436 | A | | 2/1980 | Etienne |
| 4,533,011 | A | * | 8/1985 | Heidemeyer et al. ...... 180/65.2 |
| 5,227,711 | A | * | 7/1993 | Gruensfelder ............... 318/807 |
| 5,285,862 | A | | 2/1994 | Furutani et al. |
| 5,318,142 | A | | 6/1994 | Bates et al. |
| 5,345,155 | A | | 9/1994 | Masaki et al. |
| 5,453,930 | A | * | 9/1995 | Imaseki et al. ............... 701/22 |
| 5,481,460 | A | | 1/1996 | Masaki et al. |
| 5,508,924 | A | * | 4/1996 | Yamashita .................. 701/22 |
| 5,512,022 | A | | 4/1996 | Suzuki |
| 5,589,743 | A | | 12/1996 | King |
| 5,629,586 | A | | 5/1997 | Yasuda et al. |
| 5,629,596 | A | | 5/1997 | Iijima et al. |
| 5,642,270 | A | | 6/1997 | Green et al. |
| 5,650,713 | A | | 7/1997 | Takeuchi et al. |
| 5,726,541 | A | | 3/1998 | Glenn et al. |

(Continued)

FOREIGN PATENT DOCUMENTS

DE 197 22 175 A1 12/1997

(Continued)

*Primary Examiner*—Rina Duda
*Assistant Examiner*—Erick Glass
(74) *Attorney, Agent, or Firm*—Oliff & Berridge, PLC

(57) ABSTRACT

A hybrid electric vehicle having an energy generation system, an energy storage system and at least one, and preferable two or more, traction drive units includes a controller for controlling operation of vehicle systems. The controller may adaptively control traction by one or more traction drive units to better propel the vehicle. The controller may, for example, prevent unnecessary wheel slip, allow a traction profile to match a desired profile, and may be used to assist in turning of the vehicle. A method of adaptive control is also provided.

20 Claims, 11 Drawing Sheets

U.S. PATENT DOCUMENTS

| | | |
|---|---|---|
| 5,739,664 A | 4/1998 | Deng et al. |
| 5,785,138 A | 7/1998 | Yoshida |
| 5,786,640 A | 7/1998 | Sakai et al. |
| 5,804,935 A | 9/1998 | Radev |
| 5,878,830 A | 3/1999 | Ruppert et al. |
| 5,898,282 A | 4/1999 | Drozdz et al. |
| 5,905,349 A | 5/1999 | Farkas et al. |
| 5,915,488 A | 6/1999 | Fliege |
| 5,924,504 A | 7/1999 | Ruppert, Jr. et al. |
| 6,073,712 A | 6/2000 | Buglione |
| 6,242,873 B1 | 6/2001 | Drozdz et al. |
| 6,295,487 B1 * | 9/2001 | Ono et al. .................. 701/22 |
| 6,314,346 B1 | 11/2001 | Kitajima et al. |
| 6,318,487 B1 * | 11/2001 | Yanase et al. ............. 180/65.2 |
| 6,333,620 B1 | 12/2001 | Schmitz et al. |
| 6,450,281 B1 * | 9/2002 | Kohler et al. .............. 180/197 |
| 6,483,198 B1 | 11/2002 | Schmitz et al. |
| 6,573,675 B1 | 6/2003 | Schmitz et al. |
| 6,615,940 B1 * | 9/2003 | Morisawa ................. 180/65.1 |
| 6,679,346 B1 * | 1/2004 | Raftari et al. .............. 180/65.3 |
| 6,717,281 B1 * | 4/2004 | Brandon et al. ........... 290/40 C |
| 6,795,935 B1 * | 9/2004 | Unkle et al. ................. 714/37 |
| 6,820,707 B1 * | 11/2004 | Cantemir .................... 180/65.6 |
| 2002/0079853 A1 * | 6/2002 | Schmitz et al. ............. 318/434 |
| 2003/0019674 A1 * | 1/2003 | Duan ........................ 180/65.3 |
| 2003/0217876 A1 * | 11/2003 | Severinsky et al. ........ 180/65.2 |
| 2004/0207350 A1 * | 10/2004 | Wilton et al. ............... 318/376 |
| 2004/0210356 A1 * | 10/2004 | Wilton et al. ................. 701/22 |
| 2004/0245947 A1 * | 12/2004 | Wilton et al. ............... 318/139 |

FOREIGN PATENT DOCUMENTS

| | | |
|---|---|---|
| EP | 0 177 770 A1 | 4/1986 |
| EP | 0 496 059 A1 | 7/1992 |
| EP | 0 906 847 A2 | 4/1999 |
| EP | 0 925 988 A2 | 6/1999 |
| WO | WO 94/07301 | 3/1994 |
| WO | WO 98/01941 | 1/1998 |

* cited by examiner

METHOD AND APPARATUS FOR ADAPTIVE CONTROL OF TRACTION DRIVE UNITS IN A HYBRID VEHICLE

CROSS-REFERENCE TO RELATED APPLICATION

This is a Continuation-in-Part of application Ser. No. 10/413,544 filed Apr. 15, 2003, now abandoned which is a Continuation-in-Part of application Ser. No. 09/748,182 filed Dec. 27, 2000, now U.S. Pat. No. 6,573,675. The entire disclosure of the prior applications are hereby incorporated by reference herein in their entirety.

BACKGROUND OF THE INVENTION

1. Field of Invention

This invention relates to methods and apparatus for adaptively controlling two or more traction drive units installed in a vehicle, including relative direction, torque, speed, power or other operational states.

2. Description of Related Art

The desire for cleaner air has caused various federal, state and local governments to adopt or change regulations requiring lower vehicle emissions. Furthermore, elevated fuel costs prompt consumer action to obtain vehicles for personal or business operations that consume less fuel or operate more efficiently.

Electric vehicles have been developed that produce zero emissions. Electric vehicles are propelled by an electric motor that is powered by a battery array on board the vehicle. The range of electric vehicles is limited as the size of the battery array which can be installed on the vehicle is limited. Recharging of the batteries can only be done by connecting the battery array to a power source. Electric vehicles are not truly zero emitters when the electricity to charge the battery array is produced by a power plant that burns, for example, coal.

Hybrid electric vehicles have also been developed to reduce emissions. Hybrid electric vehicles include an internal combustion engine and at least one electric motor powered by a battery array. In a parallel type hybrid electric vehicle, both the internal combustion engine and the electric motor are coupled to the drive train via mechanical means. The electric motor may be used to propel the vehicle at low speeds and to assist the internal combustion engine at higher speeds. The electric motor may also be driven, in part, by the internal combustion engine and be operated as a generator to recharge the battery array.

In a series type hybrid electric vehicle, the internal combustion engine is used only to run a generator that charges the battery array. There is no mechanical connection of the internal combustion engine to the vehicle drive train. The electric traction drive motor is powered by the battery array and is mechanically connected to the vehicle drive train.

Conventional internal combustion engine vehicles control propulsion by increasing and decreasing the flow of fuel to the cylinders of the engine in response to the position of an accelerator pedal. Electric and hybrid electric vehicles also control propulsion by increasing or decreasing the rotation of the electric motor or motors in response to the position of an accelerator pedal. Electric and series type hybrid electric vehicles may be unable to accelerate properly if the power available from the battery or batteries and/or genset is insufficient.

Conventional internal combustion engine vehicles may also include systems to monitor the slip of a wheel or wheels to thereby control the internal combustion engine and/or the brakes of the vehicle to reduce the slip of the wheel or wheels.

SUMMARY OF THE INVENTION

The invention provides methods and apparatus for adaptively controlling the operation of one or more traction drive units in a hybrid vehicle.

In hybrid electric vehicles, it is necessary to control the speed and torque of the electric motor or motors to control the slip of the wheels. According to aspects of the invention, the control of the speed, power, direction and torque of the traction drive units (when more than one is employed) allows for the addition of a range of functionality and benefits, including traction control, tight turning, reduced output operation, and others.

An exemplary embodiment of a hybrid electric vehicle according to aspects of the invention includes an energy generation system, an energy storage system receiving power at least from the energy generation system, and at least one, preferably two, traction drive units receiving power from the energy storage system. The vehicle is adaptively controlled so that the operation of each of the at least one traction drive unit may be specified as a result of conditions of various vehicle inputs and external inputs and of system states and conditions.

According to an exemplary embodiment, a method for determining the control of the traction drive units of a hybrid electric vehicle having an energy generation system, an energy storage system receiving power at least from the energy generation system, and at least two traction drive units receiving power from the energy storage system, consists of comparing the states of the various traction control units, monitoring the conditions of various vehicle and external inputs and of system states and conditions, determining the control of each of the various traction control units, and generating commands based upon the determined controls to operate the traction drive units in accordance with the parameters of the determined control method.

Other features of the invention will become apparent as the following description proceeds and upon reference to the drawings.

BRIEF DESCRIPTION OF THE DRAWINGS

Various exemplary embodiments of this invention will be described in detail with reference to the following figures, wherein like numerals reference like elements, and wherein.

DESCRIPTION OF EXEMPLARY EMBODIMENTS

Figure 1:
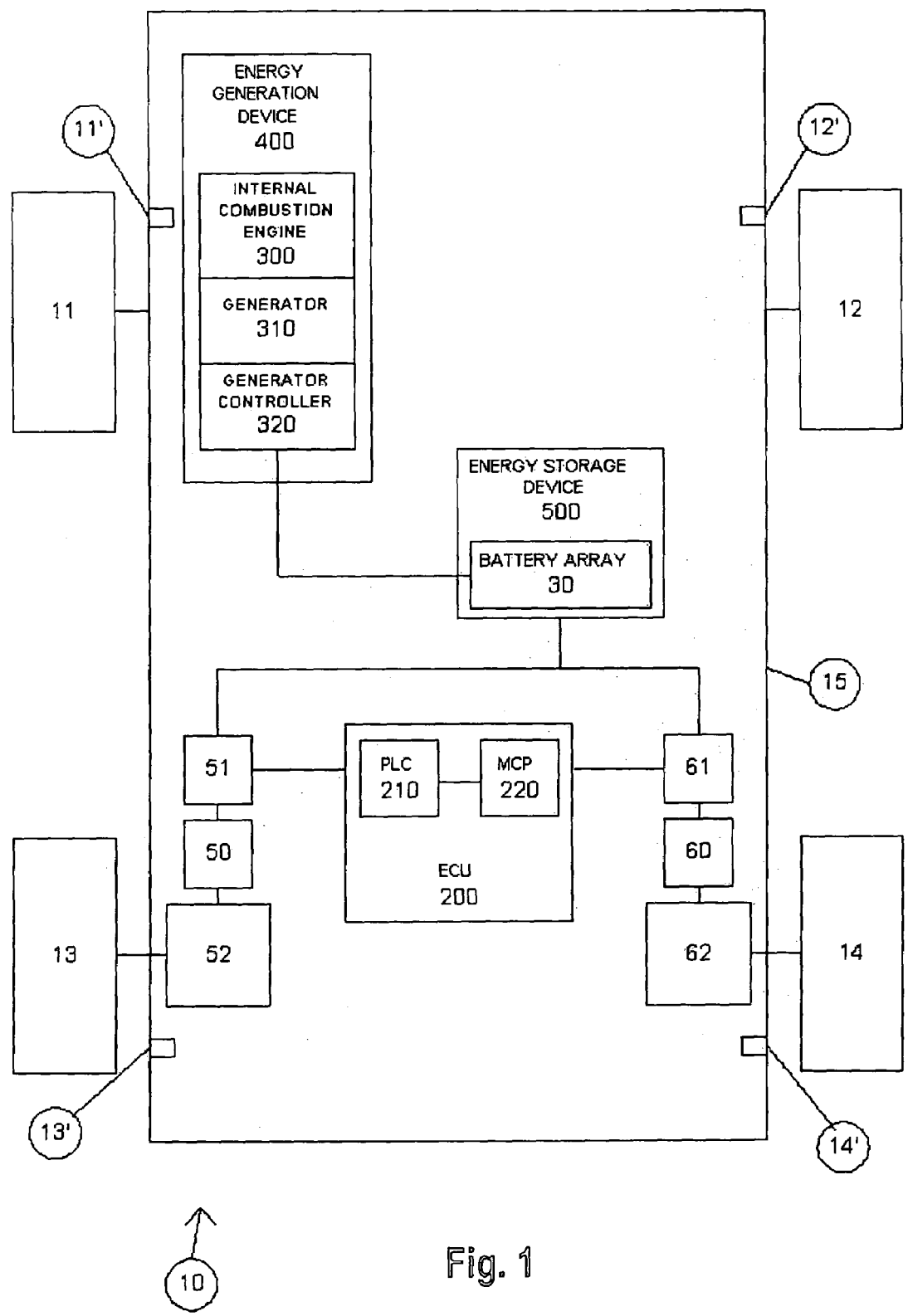
FIG. 1 is a schematic view of an exemplary embodiment of a hybrid electric vehicle according to the invention.

Referring to FIG. 1, an exemplary embodiment of a hybrid electric vehicle 10 according to the invention includes a plurality of wheels 11, 12, 13, and 14 and a vehicle chassis 15. The wheels 13 and 14 are coupled to traction drive units 50 and 60, respectively, through gear boxes 52 and 62, respectively. In the exemplary embodiment, these traction drive units 50 and 60 may be electric drive motors, however, other devices capable of producing tractive effort, such as hydrostatic-type drives, may be used. The wheels 13 and 14 are independently mounted to respective suspension components, such as swing arms. In this embodiment, the wheels 13 and 14 are not coupled together by an axle. In other embodiments, the wheels 13 and 14 may be coupled together, for example, by an axle.

The wheels 13 and 14 may be either the front wheels or the rear wheels of the vehicle 10. In this embodiment, the wheels 11 and 12 are not driven and may be coupled together by an axle. In other embodiments, the wheels 11 and 12 may be driven.

Four wheel speed sensors 11'–14' are provided for sensing the rotational speed of each wheel 11–14, respectively. Any known or subsequently developed sensor may be used. For example, speed sensors 11'–14' could be inductive-type pickup sensors, such as commonly used in vehicle anti-lock braking systems to detect wheel speed.

In an exemplary embodiment of the vehicle according to the invention, the vehicle 10 is a bus having an occupancy capacity in excess of 100. However, it should be appreciated that the vehicle may be a bus of a smaller capacity or that the vehicle may be a smaller passenger vehicle, such as a sedan. In various exemplary embodiments, the vehicle may be any size and form currently used or later developed.

The traction drive units 50 and 60 are powered by an energy storage device 500, such as a battery array 30, and are controlled by drive motor controllers 51 and 61, respectively. It will be appreciated that other energy storage devices, such as ultracapacitors, flywheels, and the like might be employed alone or in combination in the energy storage device 500. According to an exemplary embodiment of the vehicle 10, the traction drive units 50 and 60 are synchronous, permanent magnet DC brushless motors. Each electric drive motor is rated for 220 Hp and 0–11,000 rpm. The maximum combined power output of the electric drive motors is thus 440 Hp. However, this invention is not limited to permanent magnet DC brushless motors, and other types of electric drive motors, such as AC induction motors, or other types of traction drives can be used.

The hybrid electric vehicle 10 is preferably a series type hybrid electric vehicle that also includes an energy generation device 400, which in an exemplary embodiment may include an internal combustion engine 300 and a generator 310 that is driven by the internal combustion engine 300. The internal combustion engine 300 may be powered by gasoline, diesel, or compressed natural gas. It should be appreciated, however, that the internal combustion engine 300 and generator 310 may be replaced by a fuel cell, turbine or any other number of alternatives for creating usable electric power. According to an exemplary embodiment of the invention, the internal combustion engine 300 may be a 2.5 liter Ford LRG-425 engine powered by compressed natural gas. The engine 300 is operated to produce 70 Hp. It should be appreciated that the power of the engine 300 may be increased by increasing the RPM of the engine 300 and decreased by decreasing the RPM of the engine 300. Other internal combustion engines can of course be utilized.

In this exemplary embodiment, the generator 310 is a DC brushless generator that produces, for example, 240–400 $V_{AC}$. In an exemplary embodiment of the vehicle 10, the generator is operated to produce 345 $V_{AC}$ during certain drive modes. An output shaft of the internal combustion engine 300 is connected to the generator 310 and the AC voltage of the generator 310 is converted to a DC voltage by a generator controller 320. However, this invention is not limited to permanent magnet DC brushless generators, and other types of electric generators, such as AC induction generators, or other types of generators can be used. The converted DC voltage charges the energy storage device 500. The energy storage device 500 may include, for example, 26 deep cycle, lead-acid batteries of 12 volts each connected in series. It should be appreciated, however, that other batteries, such as nickel cadmium, metal hydride or lithium ion, or that other energy storage devices, such as capacitors, ultracapacitors, or flywheels may be used and that any number of batteries or other devices may be employed, as space permits. Depending upon the load on the vehicle 10, the battery array voltage ranges between 240 and 400 $V_{DC}$.

In this exemplary embodiment, an electronic control unit (ECU) 200 includes a programmable logic controller (PLC) 210 and a master control panel (MCP) 220. The MCP 220 receives input from various sensors and provides the connection to outputs in the vehicle 10 and the PLC 210 executes various programs to control, for example, the energy generation device 400, the energy storage device 500, the traction drive units 50 and 60, and the motor controllers 51 and 61.

Although not shown in the drawings, the vehicle 10 includes a cooling system or cooling systems for the energy generation device 500, the energy storage device 400, and the traction drive unit controllers 51 and 61. The cooling system may be a single system which includes a coolant reservoir, a pump for pumping the coolant through a heat exchanger such as a radiator and a fan for moving air across the heat exchanger or a plurality of cooling systems similarly constructed. The ECU 200 controls the cooling systems, including the pumps and the fans, to perform a heat shedding operation in which the heat generated by the engine 300, the controllers 320, 51, and 61, the energy storage device 500, and various other systems is released to the atmosphere. Any acceptable means and methods for cooling the vehicle components may be utilized.

Figure 2:
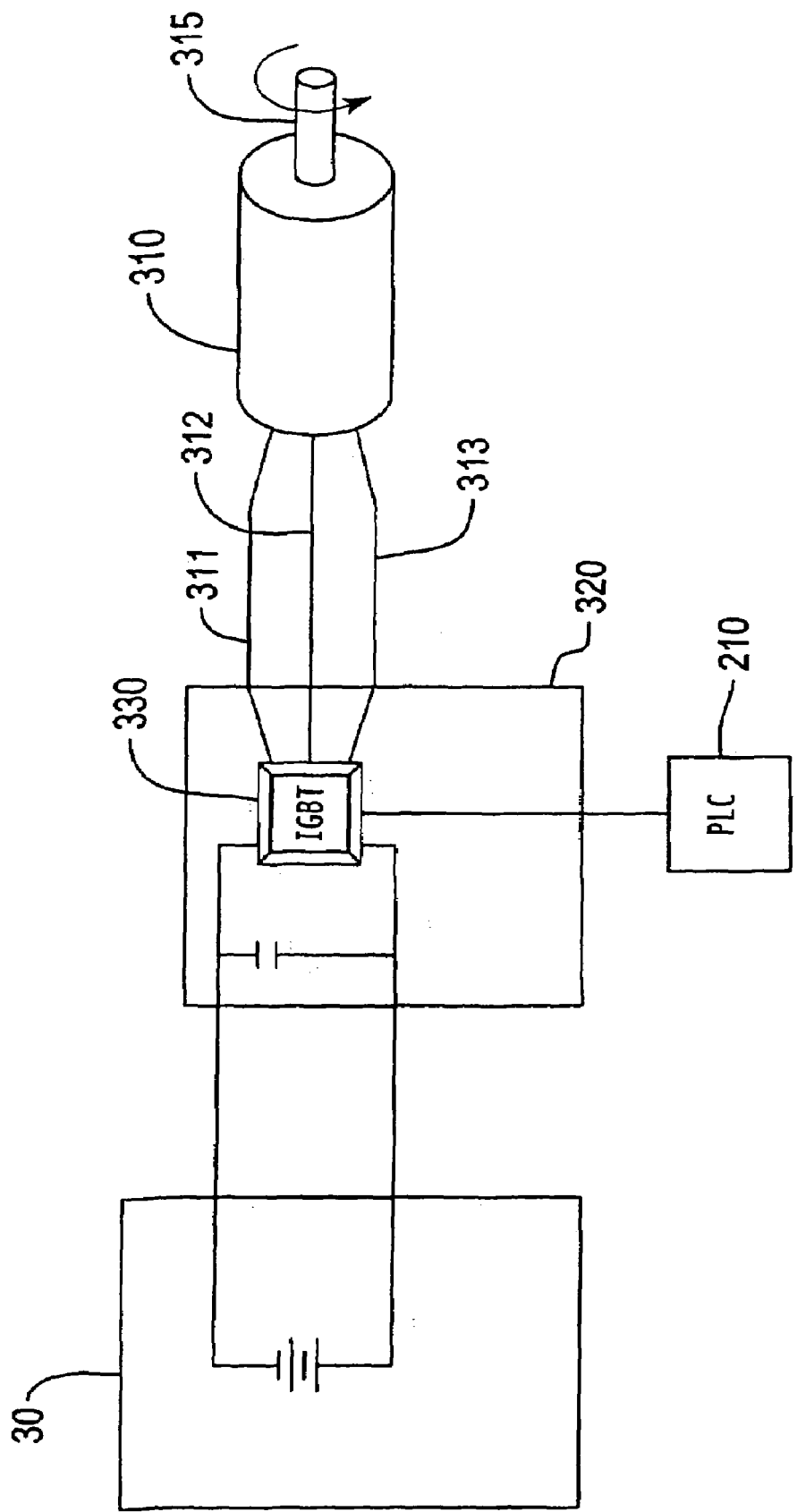
FIG. 2 is a schematic diagram illustrating an exemplary embodiment of a circuit for controlling charging of the battery array by a generator.

As shown in FIG. 2, the coils of the generator 310 are connected to the generator controller 320 by leads 311, 312, and 313. The generator controller 320 includes two switching insulated or isolated gate bipolar transistors (IGBT) 330 per phase of the generator 310 and their corresponding diodes. In an exemplary embodiment including a three phase generator 310, the generator controller 320 includes 6 IGBT 330 and six corresponding diodes.

The PLC 210 controls each IGBT 330 of the generator controller 320 to control the conversion of the AC voltage of the generator 310 to the DC voltage for charging the battery array 30. The PLC 210 may switch one or more of the IGBT 330's off when the SOC of the battery array 30 reaches an upper control limit, to stop the conversion of the AC voltage to DC voltage and prevent overcharging of the battery array 30.

According to an exemplary embodiment of the invention, the engine 300 runs continuously during operation of the vehicle 10 and continuously turns the shaft 315 of the generator 310. The PLC 210 switches each IGBT 330 on and off via high speed pulse width modulation (PWM) to control charging of the battery array 30. It should be appreciated however that the PLC 210 may control the charging of the battery array 30 by turning the engine 300 on and off, or in the alternative, by changing the RPM's of the engine 300.

Figure 3:
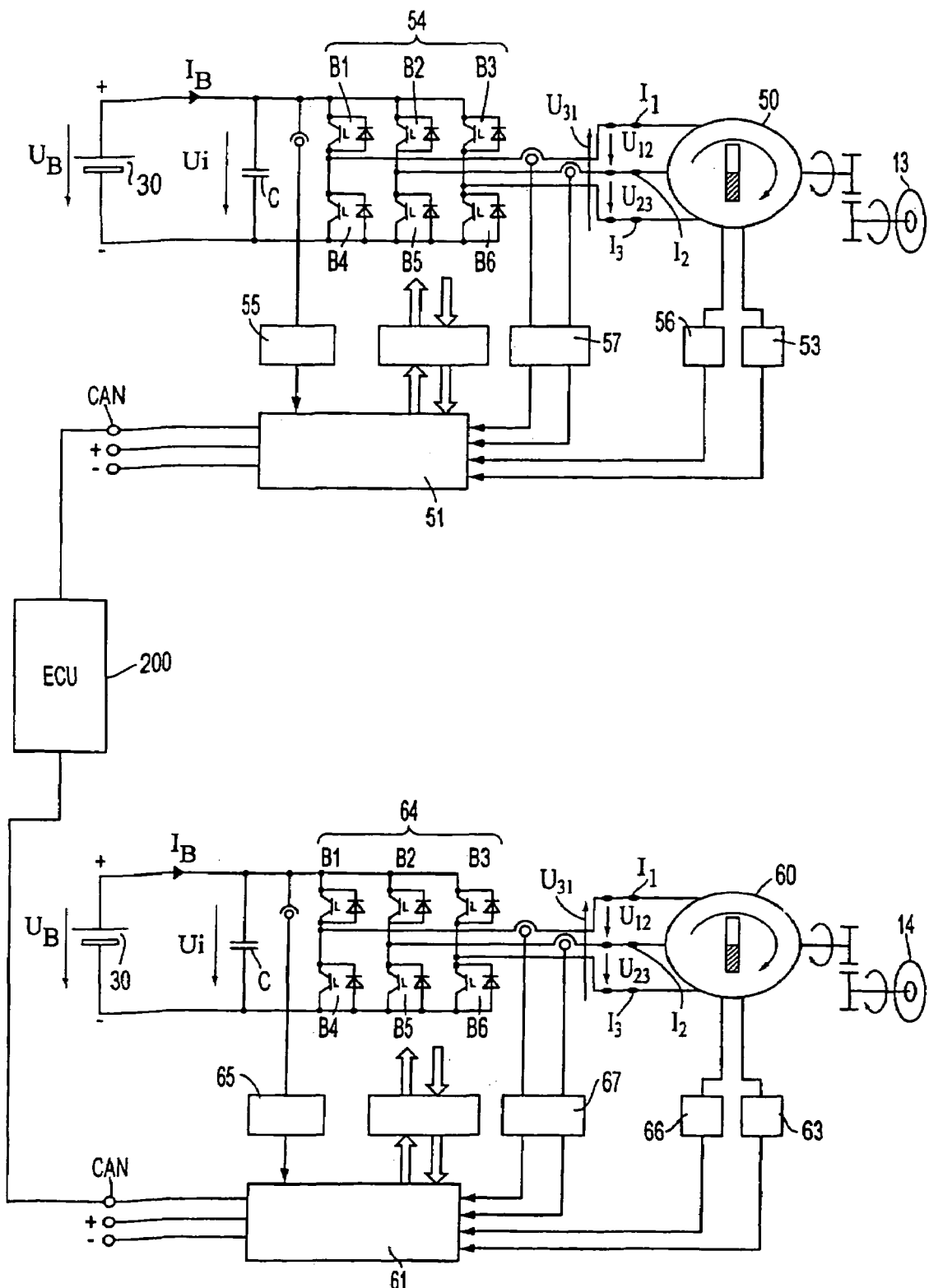
FIG. 3 is a diagram illustrating an exemplary embodiment of a circuit for controlling electric motors as traction drive units.

A possible control circuit for the traction drive units 50 and 60 is illustrated in FIG. 3, and includes the motor controllers 51 and 61. The motor controllers 51 and 61 receive power from the battery array 30 and distribute the power to the traction drive units 50 and 60, by switches B1–B6 of pulse width modulation (PWM) inverters 54 and 64. The PWM inverters 54 and 64 generate AC current from the DC current received from the battery array 30. The battery current $I_B$ is distributed by the switches B1–B6, for example IGBT, of the PWM inverters 54 and 64 into motor currents $I_1$, $I_2$, and $I_3$ for driving the motors 50 and 60.

The motor controllers 51 and 61 distribute the battery current $I_B$ via the switches B1–B6 by factoring feedback from position sensors 53 and 63 and encoders 56 and 66 that determine the timing or pulsing of electromagnets of the motors 50 and 60. The pole position sensors 53 and 63 determine the pole positions of the permanent magnets of the motors 50 and 60 and the encoders 56 and 66 determine the phase angle. It should be appreciated that each pair of pole position sensors 53 and 63 and encoders 56 and 66, respectively, may be replaced by a phase position sensor and the phase change frequency may be read to determine the speed of rotation of the electric motors 50 and 60.

The motor controllers 51 and 61 calculate the motor connector voltages $U_{12}$, $U_{31}$, and $U_{23}$ based on the rotary velocity and the known flux value of the motors 50 and 60 between the motor connectors. The operating voltage of the inverters 54 and 64 is then determined by the rectified voltages of the diodes of the switches B1–B6 or by the voltage Ui of an intermediate circuit including a capacitor C. If the voltage Ui becomes larger than the battery voltage $U_B$, uncontrolled current may flow to the battery array 30. Voltage sensors 55 and 65 determine the voltage Ui and the motor controllers 51 and 61 compare the voltage Ui to the battery voltage $U_B$. The motor controllers 51 and 61 activate the switches B1–B6 to cause magnetizing current to flow directly to the motors 50 and 60 to avoid unnecessary recharging of the battery array 30.

As shown in FIG. 3, each motor controller 51 and 61 receives control data from the ECU 200 through a controller area network (CAN). The ECU 200 can communicate with the various sensors and the motor controllers 51 and 61 by, for example, DeviceNet™, an open, global industry standard communication network.

Figure 4:
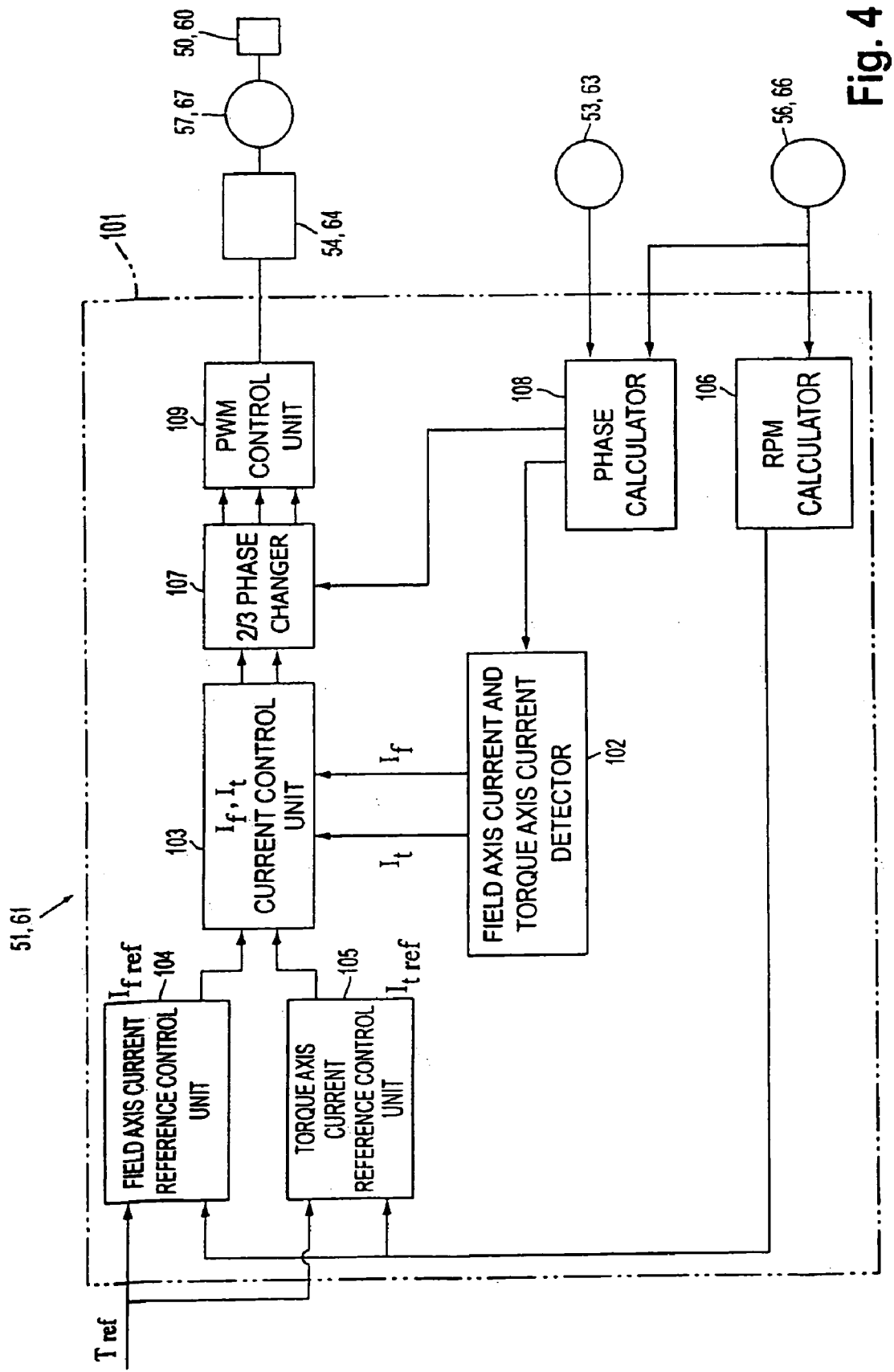
FIG. 4 is a diagram illustrating an exemplary embodiment of a circuit for controlling motor controllers.

Referring to FIG. 4, each motor controller 51 and 61 includes a control unit 101 including a field axis current and torque axis current detector 102. The detector 102 calculates the torque axis current $I_t$ and the field axis current $I_f$ of each motor 50 and 60 by executing a 3-phase, 2-phase coordinate transfer from the input of the pole position sensors 53 and 64 and the encoders 56 and 66. The torque axis current $I_t$ and the field axis current $I_f$ calculated by the detector 102 are input to a field axis current and torque axis current control unit 103. The current control unit 103 receives a field axis current reference value $I_{fref}$ from a field axis current reference control unit 104 and receives a torque axis current reference value $I_{tref}$ from a torque axis current reference control unit 105.

The reference control units 104 and 105 determine the current reference values $I_{fref}$ and $I_{tref}$ by comparing a torque reference value $T_{ref}$ (which is determined by the position of an accelerator pedal of the vehicle) with the actual rotational velocity determined by an rpm calculator 106 that receives input from the encoders 56 and 66. A 2/3 phase changer 107 receives input from a phase calculator 108 and calculates the 3-phase AC reference values by performing a 2-phase/3-phase coordinate transformation. A PWM control unit 109 generates a PWM signal by comparing the 3-phase reference values with a triangular wave signal which is input to the PWM inverters 54 and 64.

Figure 5:
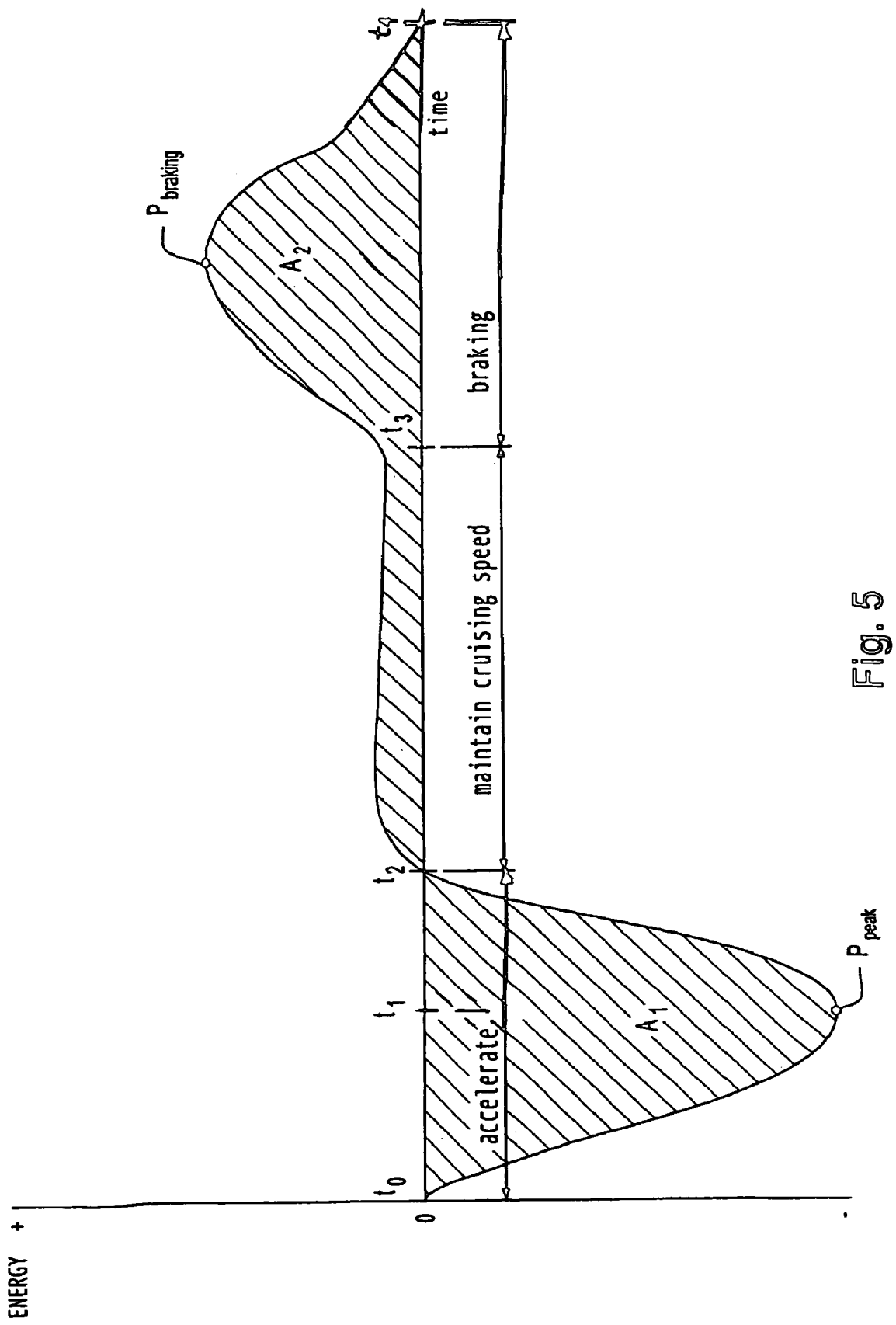
FIG. 5 is a diagram illustrating the relationship between the power created, the power stored, and the power consumed by the exemplary hybrid electric vehicle according to the invention.

Referring to FIG. 5, the relationship between the power generated, the power stored, and the power consumed over time, by the series hybrid electric vehicle 10 according to the invention will be explained.

Power is consumed from the energy storage device 500 by the traction drive units 50 and 60 during acceleration of the vehicle 10 to a cruising speed. As shown in FIG. 5, the vehicle 10 reaches cruising speed at time $t_1$ which corresponds to a peak power $P_{peak}$ of the traction drive units 50 and 60. The peak power $P_{peak}$ the traction drive units 50 and 60 is dependent on the driving mode (discussed below) of the vehicle 10 selected by the operator. In the exemplary embodiment of the invention in which the traction drive units are each 220 HP electric motors 50 and 60, the peak power $P_{peak}$ consumed by the electric motors 50 and 60 is 440 Hp.

The power consumption (traction effort) of the electric motors 50 and 60 during acceleration is represented by the curve below the horizontal axis and the area defined by the curve below the horizontal axis between the times $t_0$ and $t_2$ represents the total power consumption of the vehicle 10 during acceleration. In the event that the SOC of the energy storage device 500 (battery array 30) is insufficient to achieve the cruising speed, the ECU 200 controls the motor controllers 51 and 61 to limit the peak power $P_{peak}$ the electric motors 50 and 60 may draw from the energy storage device 500 (battery array 30). After the vehicle 10 has accelerated to cruising speed, the traction effort of the electric motors 50 and 60 may be reduced between the time $t_1$ and the time $t_2$, and the power consumption by the electric motors 50 and 60 may also be reduced.

The cruising speed of the vehicle 10 is maintained between the time $t_2$ and the time $t_3$. In this embodiment, during the time between $t_2$ and $t_3$, the energy generation device 400 is operated to produce power $P_{gen}$ higher than the power consumption (traction effort) of the electric motors 50 and 60 necessary to maintain the vehicle's cruising speed. The differential in power between the traction effort and the power generated $P_{gen}$ is stored in the battery array 30.

The power $P_{gen}$ generated by the energy generation device 400 in this embodiment is dependent on the rpm of the engine 300 and a user demand signal sent to the energy generation device 400 that is controlled by the ECU 200. The ECU 200 controls the engine 300 to generally maintain the rpm of the engine 300, and the power generated $P_{gen}$, constant. However, it should be appreciated that the ECU 200 may control the engine 300 to reduce or increase the rpm of the engine 300, and thus the reduce or increase, respectively, the power generated $P_{gen}$.

The power generated $P_{gen}$ by the energy generation device 400 may be reduced if the SOC of the energy storage device 500 approaches an upper control limit at which the energy storage device 500 (battery array 30) may become overcharged. The power generated $P_{gen}$ by the energy generation device 400 may be increased if the SOC of the energy storage device 500 (battery array 30) approaches a lower control limit at which the battery array 30 would be unable to drive the electric motors 50 and 60 with enough torque to propel the vehicle 10. In an exemplary embodiment of the vehicle 10 in which the engine 300 is a 2.5 liter Ford LRG-425 engine powered by compressed natural gas, the power generated $P_{gen}$ is 70 Hp.

Regenerative braking occurs between the times $t_3$ and $t_4$ when the vehicle 10 decelerates after release of the accelerator pedal or when the vehicle 10 travels on a downhill slope at a constant speed. During regenerative braking, the traction drive units 50 and 60 function as generators and current is supplied to the energy storage device 500, such as battery array 30, by the traction drive units 50 and 60. The power generated $P_{braking}$ during regenerative braking is stored in the energy storage device 500.

The power generated by the energy generating device 400 during maintenance of the cruising speed and the power generated by regenerative braking $P_{braking}$ is represented by the curve above the horizontal axis and the area $A_2$ defined by the curve above the horizontal axis represents the total energy creation and storage of the vehicle 10 during maintenance of the cruising speed and regenerative braking.

The power $P_{gen}$ of the energy generation device 400 and the regenerative braking power $P_{braking}$ are controlled by the ECU 200 to substantially equal the energy consumption (traction effort) of the traction drive units 50 and 60 during acceleration. In other words, the area $A_1$ defined by the curve below the horizontal axis is equal to the area $A_2$ defined by the curve above the horizontal axis. The ECU 200 controls the traction effort of the traction drive units 50 and 60 (including the peak power $P_{peak}$) and the power generated $P_{gen}$ so that the power generated and the power stored do not exceed the power consumed, and vice versa, so as to maintain the SOC of the energy storage device 500 (battery array 30) within a range of control limits. The ECU 200 controls the power generated $P_{gen}$ and the traction effort of the traction drive units 50 and 60 so that the ampere hours during energy consumption do not exceed the thermal capacity of the energy storage device during power creation and storage.

As discussed above, in certain operational modes, the energy generation device 400 operates to produce power greater than the power consumption of the traction drive units 50 and 60. In various exemplary embodiments, the power output by the energy generation device 400 declines as the SOC of the energy storage device 500 approaches a high level SOC. The energy storage device 500 is not fully charged, but managed to a SOC level predetermined to maximize the battery life and to accommodate the power requirements of the electric drive motors 50 and 60. Thus, it should be appreciated that the energy storage device 500 can be maintained at any SOC level less than the maximum SOC level. By keeping the energy storage device 500 at less than the maximum SOC, the energy storage device 500 is less likely to experience mechanical or thermal failure due to overcharging.

Furthermore, the ECU 220 can determine the SOC of the battery array 30 over a period of time to determine if there are any trends in the SOC level. The trend can be an overall reduction, increase, or maintaining of the SOC of the energy storage device 500 over a predetermined period of time. The ECU 220 can then adjust the energy requirement of the energy generation device 400 accordingly.

An exemplary method and embodiment for adaptively controlling the state of charge SOC of the energy storage device 500 is disclosed in U.S. Pat. No. 6,333,620, the contents of which are hereby incorporated by reference herein in its entirety.

The control of the electric drive motors is accomplished by sending a command signal to the electric drive motor controller unit attached to each drive motor. The ECU 200 uses a control algorithm such as the exemplary embodiment described below to determine the appropriate command to deliver to the motor controller. Depending upon the type and design of the motor controller device, the command signal supplied to the motor controller may be a torque command signal, a speed command signal, a position command signal, or other type of command signal to indicate the desired operation to the motor controller. An exemplary embodiment of a motor controller device and method of controlling an electric motor in torque, speed and position output is disclosed in U.S. patent application Ser. No. 20020096375, the contents of which are hereby incorporated by reference herein in its entirety.

Exemplary embodiments for controlling the hybrid electric vehicle 10 will be explained with reference to FIGS. 6–12. The subroutines illustrated in FIGS. 6–12 may be automatically executed concurrently at predetermined times, intervals, or locations during operation of the vehicle 10, by internal or remote signal to the ECU 220, or executed manually.

Figure 6:
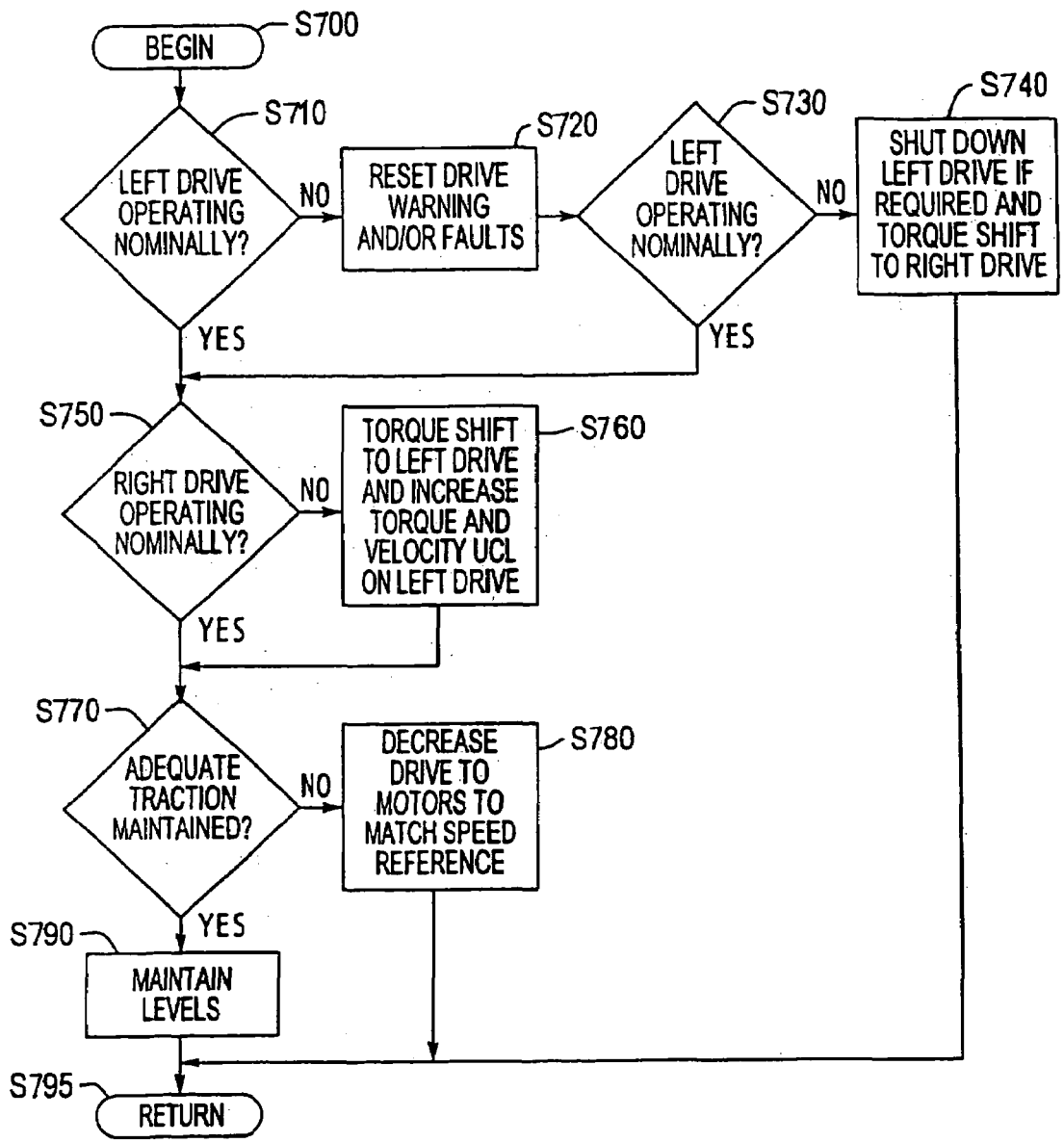
FIGS. 6–7 are a first exemplary embodiment of adaptive control of propulsion of traction drive units of the hybrid vehicle according to the invention.

Referring to FIG. 6, a left traction control subroutine for the electric motor 50 (left traction drive), in an exemplary embodiment in which the vehicle 10 is rear wheel drive, begins in step S700 and proceeds to step S710 where it is determined if the electric motor 50 is operating nominally. According to an exemplary embodiment of the invention, the electric motor 50 is determined to be operating nominally if the voltage and temperature of the electric motor 50 are within predetermined parameters. If the electric motor 50 is not operating nominally (S710: No), the control proceeds to step S720 where a drive warning and/or faults are reset. The faults are error codes generated by the ECU 200 upon detection of abnormalities, such as a short circuit in an IGBT 330 or failure of an encoder 56 or 66. The control then proceeds to step S730 where it is determined if the electric motor 50 is operating nominally. If the electric motor is still not operating nominally (S730: No), the control proceeds to step S740 where the electric motor 50 is shut down if required and torque is shifted to the right side by increasing the torque drive command to the electric motor 60. The control then returns to the beginning in step S795.

If after resetting the drive warning and/or faults, it is determined that the electric motor 50 is operating nominally (S730: Yes), the control proceeds to step S750 where it is determined if the electric motor 60 (right drive in the exemplary rear wheel drive vehicle 10) is operating nominally. The electric motor 60 is determined to be operating nominally if the voltage and temperature of the electric motor 60 are within predetermined parameters. If the electric motor 60 is not operating nominally (S750: No), the control proceeds to step S760 where torque is shifted to the left drive by increasing the drive to the electric motor 50 and increasing upper control limits of the torque and velocity of the electric motor 50. The control then proceeds to step S770. If it is determined that the electric motor 60 is operating nominally (S750: Yes), the control proceeds directly to step S770.

In step S770, it is determined if adequate traction is maintained. Adequate traction is not maintained if excessive slippage is detected between a rear wheel 13 or 14 and a speed reference which is a value slightly higher than the speed of the front wheels 11 and 12, which can be determined in various ways, such as by comparison of wheel speed sensors 11'–14'. If adequate traction is not maintained (S770: No), the control proceeds to step S780 where the drive to motors 50 and 60 is decreased until the speed of the wheels 13 and 14 matches the speed reference value. The control then returns to the beginning in step S795. If adequate traction is maintained (S770: Yes), the drives to the motors 50 and 60 are maintained in step S790. The control then returns to the beginning in step S795.

Figure 7:
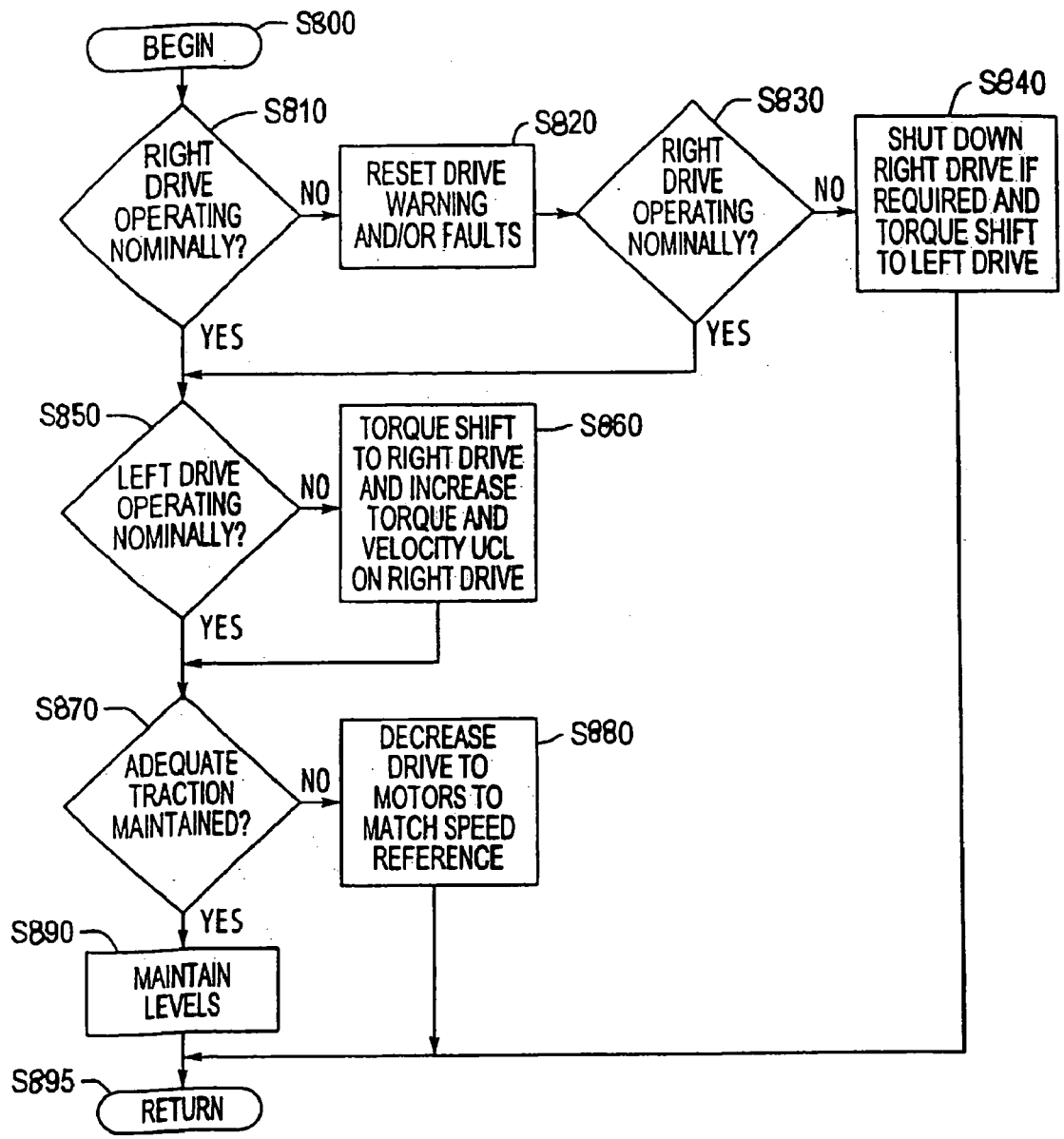

Referring to FIG. 7, a right traction control subroutine including steps S800–S895 for the electric motor 60 (right drive) corresponds to the steps S700–S795 of the left traction control subroutine shown in FIG. 6. The right drive is checked in steps S810 and S830 to determine if the electric motor 60 is operating nominally and the left drive is checked in step S850 to determine if the electric motor 50 is operating nominally.

Figure 8:
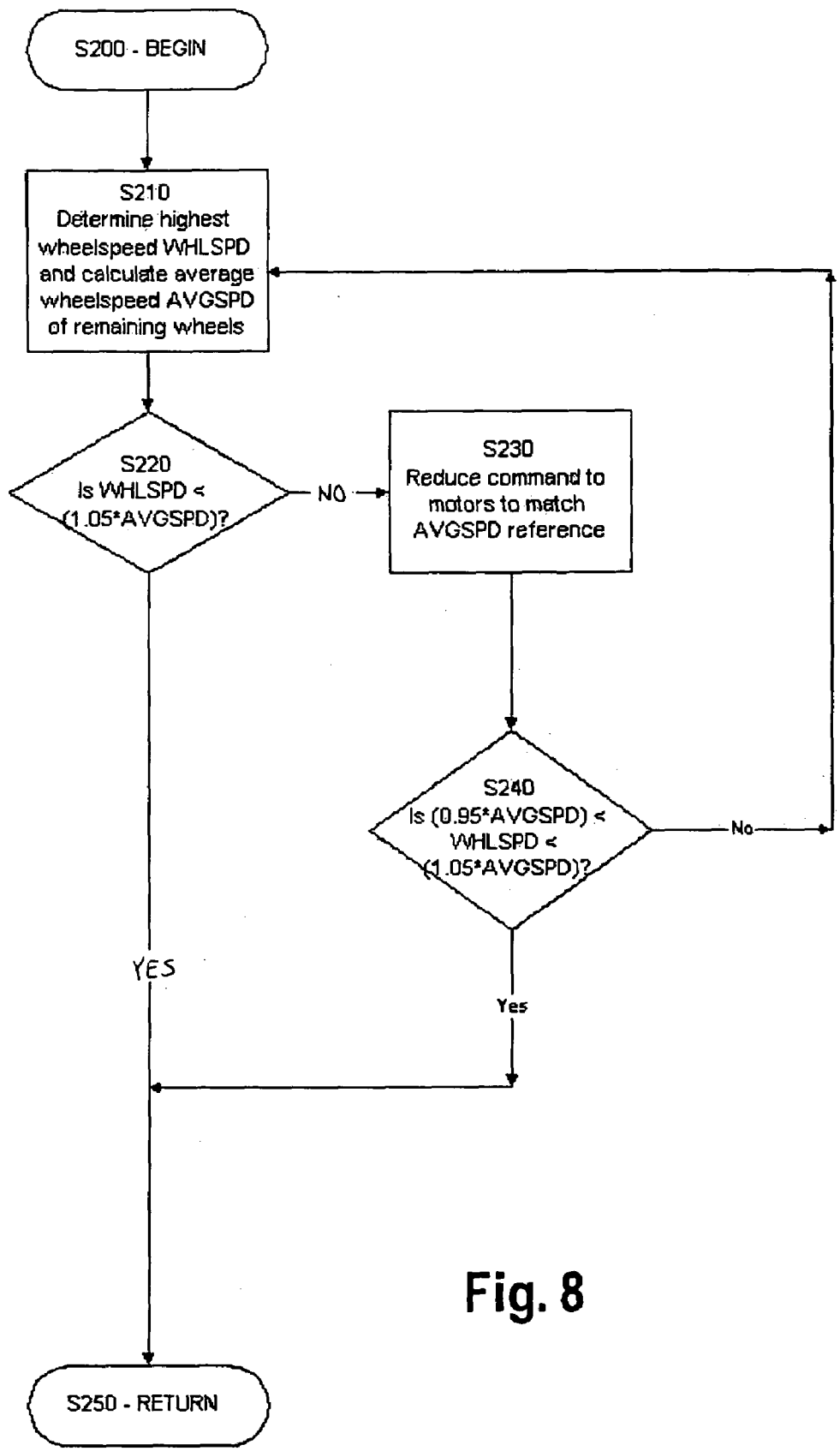
FIGS. 8–11 are additional exemplary embodiments of adaptive control of the traction drive units to achieve propulsion and/or steering of the hybrid vehicle according to the invention.

Referring to FIG. 8, another exemplary embodiment of a traction control subroutine for the vehicle 10 is described. The control begins at step S200 and proceeds to step S210 where the control examines the wheel speeds of the various wheel speed sensors 11'–4'. The variable WHLSPD is set to the highest wheel speed value examined, and an average wheel speed AVGSPD is calculated from the remaining wheel speed inputs, not including the speed WHLSPD. In this embodiment, the value WHLSPD is the speed of the wheel most likely to be slipping, and AVGSPD represents the speed reference value of the vehicle. The control then proceeds to step S220. In step S220, it is determined if the wheel speed WHLSPD is greater than some percentage of the average wheel speed AVGSPD. In an exemplary embodiment, this value may be 105% of the average wheel speed AVGSPD. A value differential greater than some percentage would indicate a likely slipping wheel, and would be greater than that difference caused, for example, by an underinflated tire. If WHLSPD is greater than 105% of AVGSPD (S220: Yes) the control proceeds to S230. If WHLSPD is not greater than 105% of AVGSPD (S220: No) the control proceeds to S250 and returns to the beginning. In step S230, the command to one or more of the traction drive motors 50, 60 is reduced to allow traction to be regained and the wheel with WHLSPD to more closely match AVGSPD. The control then proceeds to S240, where it is determined if the value WHLSPD has been sufficiently reduced to be within some percentage of AVGSPD. In an exemplary embodiment, the value of WHLSPD is examined to determine if it is between 95% and 105% of the value of AVGSPD. If it is within 95% and 105% of the value of AVGSPD (S240: Yes) the control proceeds to step S250, where it returns to the beginning. If WHLSPD is not within the limit (S240: No) the control proceeds back to step S210, where WHLSPD is re-determined and the average AVGSPD is recalculated, re-starting the subroutine.

Figure 9:
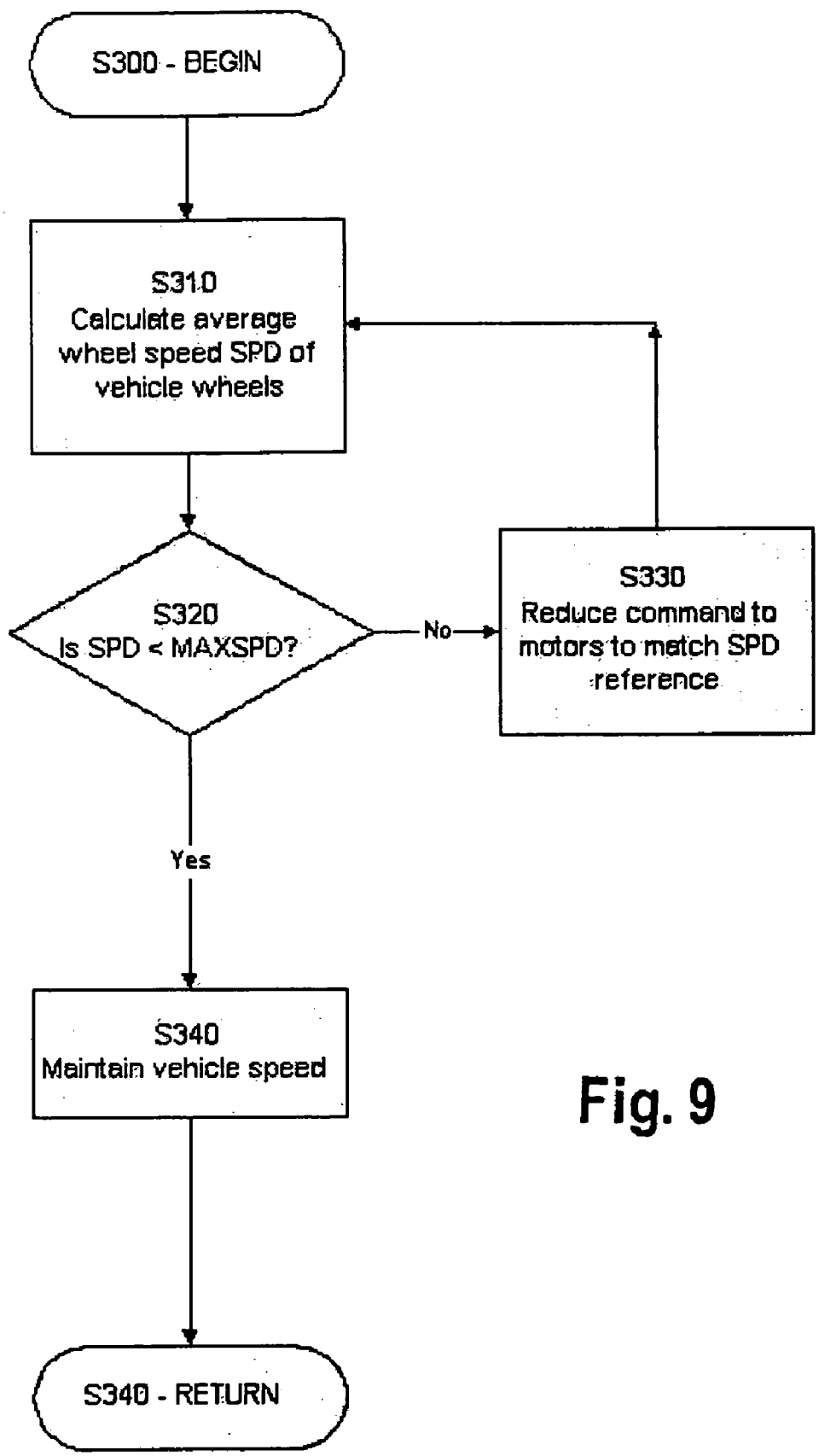

Referring to FIG. 9, an exemplary embodiment of a speed control routine for the vehicle 10 is described. The control begins at step S300 and proceeds to step S310, where a vehicle speed reference value SPD is calculated by measuring the wheel speeds determined at the wheel speed sensors 11'–14' and computing an average value, with erroneous or false readings (due to errors, faults, wheel slippage or other captured events) eliminated from the average. The control then proceeds to step S320, where it is determined if the value SPD is less than the value MAXSPD. In an exemplary embodiment, the value of MAXSPD is determined by the selection of an operator input such as a switch that indicates the maximum desired speed range of the vehicle. It will be appreciated that many additional methods of determining the value of MAXSPD are available, including an external signal, a default limit of the traction drive unit, a preset value in controller memory, or the selection of a particular driving or performance mode of the vehicle 10. An exemplary description of a method to select a driving or a performance mode is detailed in co-pending U.S. patent application Ser. No. 10/795,348 filed Mar. 9, 2004, the contents of which are hereby incorporated by reference herein in its entirety. If the value SPD is less than the value MAXSPD (S320: Yes) the control proceeds to step S340, where the current driving speed is maintained. The control then proceeds to step S350, where it returns to the beginning. If the value SPD is not less than the value MAXSPD (S320: No) the control proceeds to step S330, where the command to the drive motors is reduced to at or below the reference value MAXSPD. The control then proceeds back to step S310, where the vehicle speed reference SPD is re-calculated and the subroutine begins again.

Figure 10:
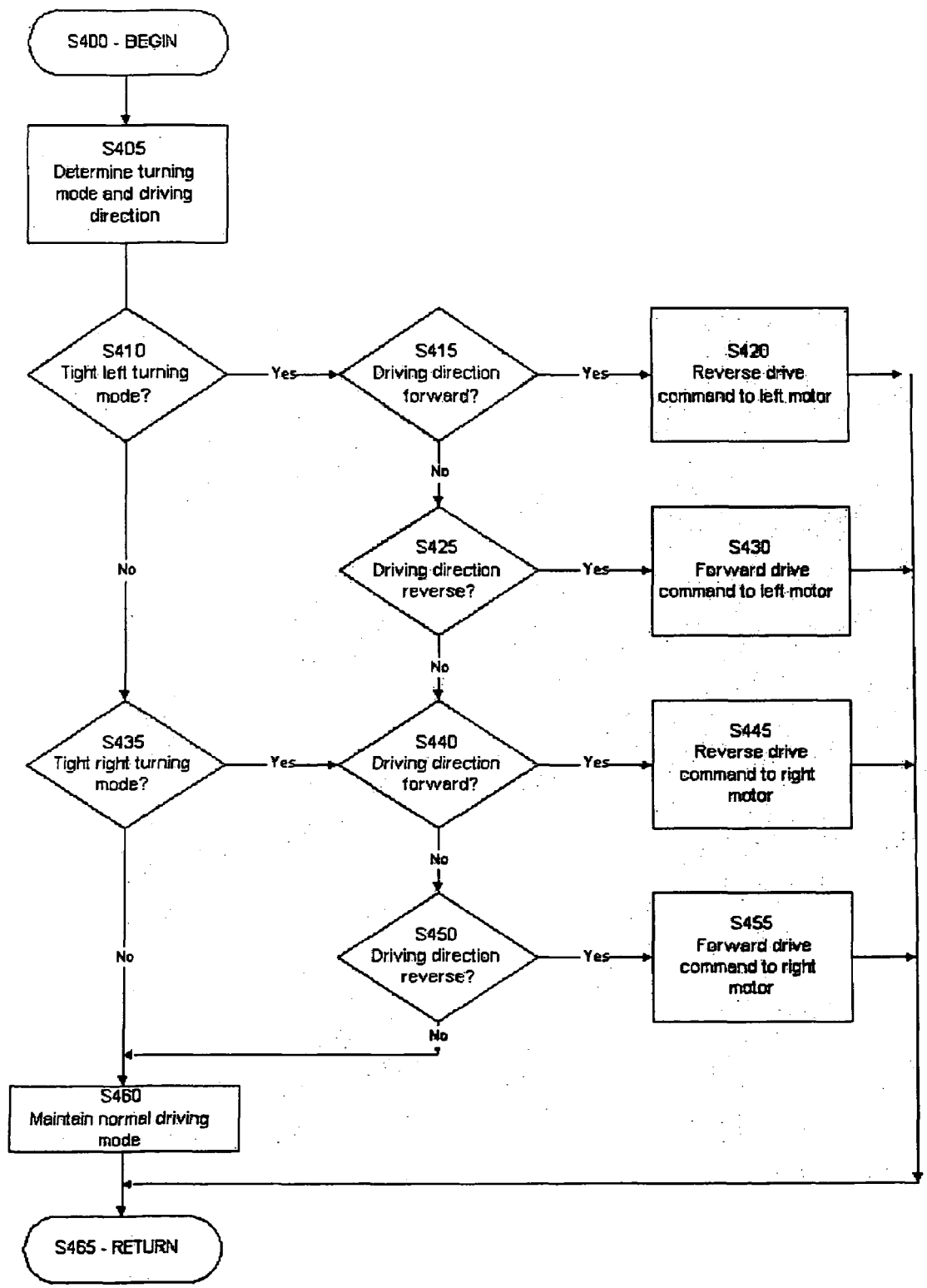

Referring to FIG. 10, an exemplary embodiment of a special turning subroutine for the vehicle 10 is described. In an exemplary embodiment, the vehicle is rear wheel drive. The control begins at step S400 and proceeds to step S405, where the turning mode and direction are determined. A special turning mode is determined by referencing the various input values supplied to the vehicle controller. In an exemplary embodiment, a tight turning mode might be selected by the triggering of a switch attached to the input shaft of the steering column of vehicle 10. A switch triggered by the clockwise rotation of the steering column would indicate a right hand turn, a switch triggered by the counter-clockwise rotation of the steering column would indicate a left hand turn. Of course it will be appreciated that other inputs or combinations of inputs may be used to trigger a tight steering mode or other specialty steering modes, and that a triggered switch is only one possible indicator of a tight turning mode.

The control then proceeds to step S410, where it is determined if the turning mode is a tight left hand turning mode. If the turning mode is not a tight left hand turning mode (S410: No) the control proceeds to step S435. If a tight left hand turning mode is active, (S410: Yes) the control proceeds to step S415, where it is determined if the driving direction is forward. If the driving direction is forward (S415: Yes) the control proceeds to step S420, where the drive command to the drive motor 50 (left hand) is issued in reverse, proportional to the forward command issued to the drive motor 60 (right hand). The control then proceeds to step S465, where it returns to the beginning. If the driving direction is determined to not be forward (S415: No), the control proceeds to step S425, where it is determined if the driving direction is reverse. If the driving direction is reverse (S425: Yes) the control proceeds to step S430, where the drive command to the drive motor 50 (left hand) is issued in forward, proportional to the reversing command issued to the drive motor 60 (right hand). The control then proceeds to step S465, where it returns to the beginning. If the driving direction is determined to not be reverse (S425: No), the control proceeds to step S435.

Although an exemplary embodiment reverses the relative rotation of the left and right motors 50, 60, it is equally possible to achieve improved steerability of the vehicle by inducing a relative speed differential between the motors.

This may be achieved by turning off one of the motors, with the other being driven, or by allowing one motor to be driven faster than the other so as to allow one corresponding driven wheel to rotate faster to facilitate turning of the vehicle 10.

In step S435, it is determined if the turning mode is a tight right hand turning mode. If the turning mode is not a tight right hand turning mode (S435: No) the control proceeds to step S460. If a tight right hand turning mode is active, (S435: Yes) the control proceeds to step S440, where it is determined if the driving direction is forward. If the driving direction is forward (S440: Yes) the control proceeds to step S445, where the drive command to the drive motor 60 (right hand) is issued in reverse, proportional to the forward command issued to the drive motor 50 (left hand). The control then proceeds to step S465, where it returns to the beginning. If the driving direction is determined to not be forward (S440: No), the control proceeds to step S450, where it is determined if the driving direction is reverse. If the driving direction is reverse (S450: Yes) the control proceeds to step S455, where the drive command to the drive motor 60 (right hand) is issued in forward, proportional to the reversing command issued to the drive motor 50 (left hand). The control then proceeds to step S465, where it returns to the beginning. If the driving direction is determined to not be reverse (S450: No), the control proceeds to step S460. In step S460, the control has determined that neither a tight left hand turning mode, nor a tight right hand turning mode have been selected. The control then maintains the normal driving mode and operates the vehicle normally. The control then proceeds to step S465, where it returns to the beginning.

Again, although an exemplary embodiment reverses the relative rotation of the left and right motors 50, 60, it is equally possible to achieve improved steerability of the vehicle by inducing a relative speed differential between the motors. This may be achieved by turning off one of the motors, with the other being driven, or by allowing one motor to be driven faster than the other so as to allow one corresponding driven wheel to rotate faster to facilitate turning of the vehicle 10.

Figure 11:
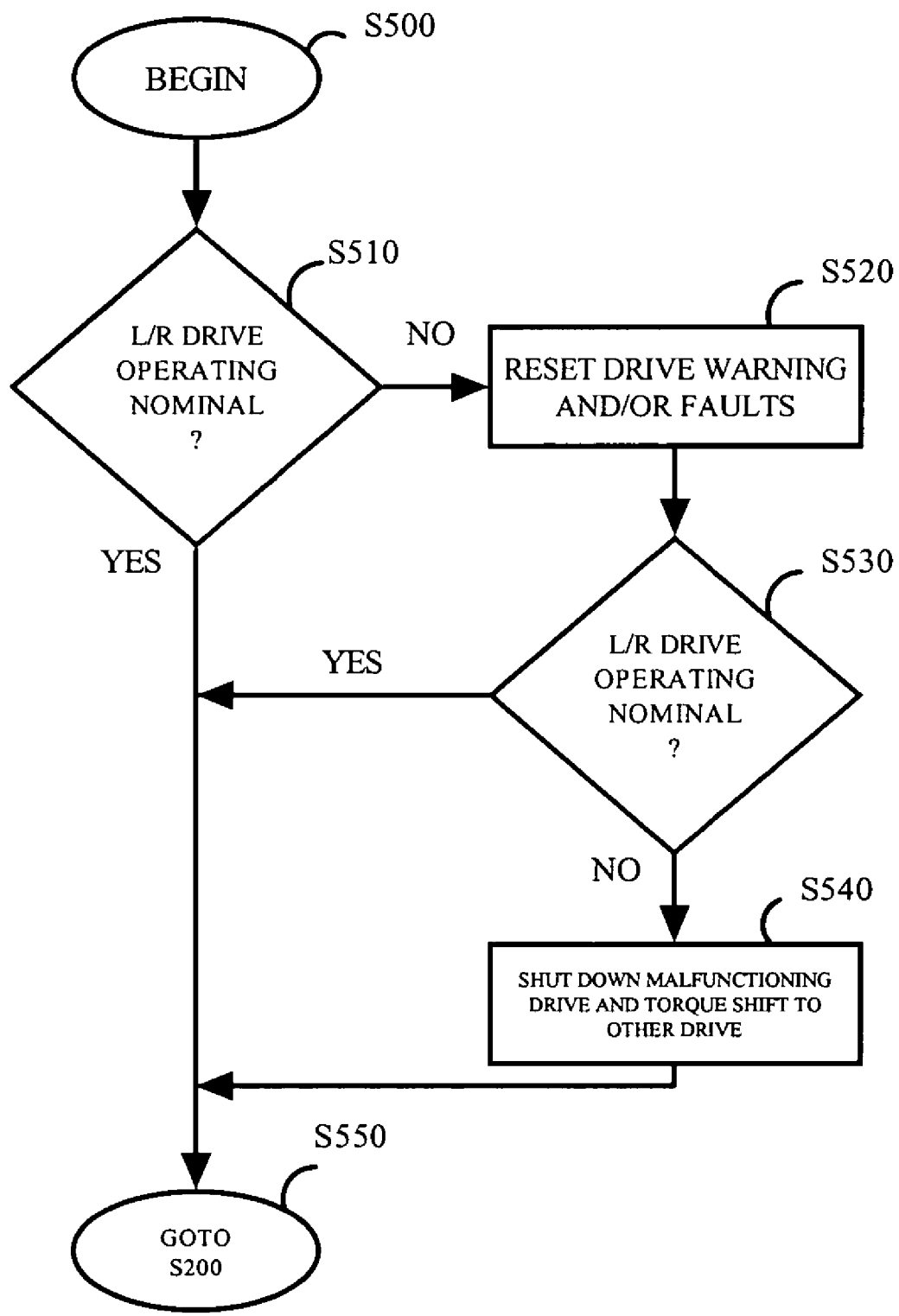

Referring to FIG. 11, an alternative power shifting control subroutine for the electric motors 50, 60 is provided. The process begins at step S500 and proceeds to step S510 where it is determined if the electric motor 50 (left side) and/or electric motor 60 (right side) is operating nominally. According to an exemplary embodiment of the invention, the electric motors 50, 60 are determined to be operating nominally if the voltage and temperature of the electric motors 50, 60 are within predetermined parameters. If any of the electric motors 50, 60 are not operating nominally (S510: No), the control proceeds to step S520 where a drive warning and/or faults are reset. The faults are error codes generated by the ECU 200 upon detection of abnormalities, such as an overtemperature condition or overspeed operation. The control then proceeds to step S530 where it is determined if the electric motors 50, 60 are operating nominally. If either electric motor is still not operating nominally (S530: No), the control proceeds to step S540 where the malfunctioning electric motor (50 or 60) is shut down, if required, and torque is shifted to the other side (i.e., the other electric motor) by increasing the torque drive command to the other electric motor (50 or 60). The control then returns to the beginning in step S550.

If after resetting the drive warning and/or faults, it is determined whether the electric motors 50, 60 are operating nominally (S530: Yes), the control proceeds to step S550 where the control returns to the beginning.

If necessary, the control can call the traction subroutine beginning in step S200, as detailed above. The use of the traction control subroutine verifies that the increased torque delivered to either electric motor 50, 60 does not allow the wheel to overcome friction and spin uncontrollably, causing a safety hazard.

It will be appreciated that in performing the process outlined in the flow chart of FIG. 11, the individual electric motors 50, 60 can be monitored in parallel or sequentially, in any order, in steps S510 and S530.

It will be appreciated by those skilled in the art that the ECU can be implemented using a single special purpose integrated circuit (e.g., ASIC) having a main or central processor section for overall, system-level control, and separate sections dedicated to performing various different specific computations, functions and other processes under control of the PLC. The ECU also can be a plurality of separate dedicated or programmable integrated or other electronic circuits or devices (e.g., hardwired electronic or logic circuits such as discrete element circuits, or programmable logic devices such as PLDs, PLAs, PALs, DSPs or the like). The ECU can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 6-12 and described herein can be used as the ECU. A distributed processing architecture can be used for maximum data/signal processing capability and speed.

While the invention has been described with reference to various exemplary embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. A method for adaptively controlling a hybrid electric vehicle including an energy generation system, an energy storage system receiving energy at least from the energy generation system, and at least two traction drive motors receiving energy from the energy storage system, comprising:

determining if one of the at least two traction drive motors is initially operating nominally;

resetting drive warning and faults, if the one traction drive motor is not initially operating nominally;

determining if the one traction drive motor is operating nominally after resetting the drive warning and faults;

shutting down the one traction drive motor if the one traction drive motor is not operating nominally after resetting the drive warning and faults;

determining if another drive motor is operating nominally, if at least one traction drive motor is operating nominally;

increasing a drive command upper control limit of at least one nominally operating traction drive motor, if the another traction drive motor is not operating nominally; and shifting torque to at least one nominally operating traction drive motor, if the other traction drive motor is not operating nominally.

2. The method of claim 1, further comprising:
monitoring the wheel speed of at least one individual wheel on the hybrid electric vehicle driven by the at least one traction drive motor;
determining a speed reference value;
comparing the speed of the at least one individual wheel to the speed reference value; and
adjusting a drive command value to the at least one traction drive motor to adaptively control traction of the at least one individual wheel based on the comparison.

3. The method of claim 2, further comprising:
determining the difference between the at least one individual wheel speed and the speed reference value;
reducing the drive command value to the at least one traction drive motor when excessive slippage is determined in the at least one individual wheel based on the determined difference to allow traction of the slipping wheel to be regained; and
maintaining the drive command value to the at least one traction drive motor if the difference indicates that adequate traction is maintained at the at least one individual wheel.

4. The method of claim 3, wherein the vehicle includes at least two traction drive motors, the method further comprising:
reducing the value of the drive command to only those traction drive motors of the at least two traction drive motors that are determined to have a corresponding wheel with excessive wheel slippage relative to the speed reference value.

5. The method of claim 2, further comprising:
maintaining the wheel speed of one or more individual wheels on the hybrid electric vehicle within a predetermined percentage of the speed reference value by modifying the drive command to the at least one traction drive motor.

6. The method of claim 2, further comprising:
determining when the vehicle is in a special turning mode; and
modifying output and drive direction commands of at least one traction drive motor when the special turning mode is selected.

7. The method of claim 6, further comprising:
determining the direction of the special turning mode; and
disabling at least one traction drive motor to facilitate turning.

8. The method of claim 6, further comprising:
determining the direction of the special turning mode; and
reversing the drive direction command of at least one traction drive motor to facilitate turning.

9. The method of claim 1, wherein the one traction drive motor is an electric motor and is operating nominally if a voltage and temperature of the electric motor are within predetermined parameters.

10. The method of claim 6, wherein the modifying includes adjusting the relative output of one of the at least two traction drive motors relative to the other to induce a relative speed differential between corresponding individual wheels associated with each of the two traction drive motors to facilitate turning of the vehicle.

11. A hybrid electric vehicle, comprising:
an energy generation system;
an energy storage system receiving energy at least from the energy generation system;
at least two traction motors receiving energy from the energy storage system; and
a vehicle controller that:
determines if one of the traction drive motors is initially operating nominally;
resets drive warning and faults, if the one traction drive motor is not initially operating nominally;
determines if the one traction drive motor is operating nominally after resetting the drive warning and faults;
shuts down the one traction drive motor if the one traction drive motor is not operating nominally after resetting the drive warning and faults;
determines if another traction drive motor is operating nominally, if the one traction drive motor is operating nominally;
increases a drive command upper control limit of at least one nominally operating traction drive motor, if the another traction drive motor is not operating nominally; and
shifts torque to at least one nominally operating traction drive motor, if the other traction drive motor is not operating nominally.

12. The vehicle of claim 11, wherein the controller:
monitors wheel speed of at least one individual wheel on the hybrid electric vehicle;
determines a speed reference value;
compares the speed of at least one individual wheel to the speed reference value; and
adjusts a drive command value to the at least one traction drive motor to adaptively control traction of the at least one individual wheel based on the comparison.

13. The vehicle of claim 12, wherein the controller:
determines the difference between the at least one individual wheel speed and the speed reference value;
reduces the drive command value to the at least one traction drive motor when excessive slippage is determined in the at least one individual wheel based on the determined difference to allow traction of the slipping wheel to be regained; and
maintains the drive command value to the at least one traction drive motor if the difference indicates that adequate traction is maintained.

14. The vehicle of claim 13, wherein the vehicle includes at least two traction drive motors and wherein the controller:
reduces the value of the drive command to only those traction drive motors of the at least two traction drive motors that are determined to have a corresponding wheel with excessive wheel slippage relative to the speed reference value.

15. The vehicle of claim 12, wherein the controller:
maintains the wheel speed of one or more individual wheels on the vehicle within a predetermined percentage of the speed reference value by modifying the drive command to the at least one traction drive motor.

16. The vehicle of claim 12, wherein the vehicle includes at least two traction drive motors and wherein the controller:
determines when the vehicle is in a special turning mode; and
modifies the output and drive direction commands of the at least one traction drive motor when the special turning mode is selected.

17. The vehicle of claim 16, wherein the controller:
determines the direction of the special turning mode; and
disables at least one traction drive motor to facilitate turning.

18. The vehicle of claim 16, wherein the controller:
determines the direction of the special turning mode; and
reverses the drive direction commands of at least one traction drive motor to facilitate turning.

19. The vehicle of claim 11, wherein the one traction drive motor is an electric motor and is operating nominally if a voltage and temperature of the electric motor are within predetermined parameters.

20. The vehicle of claim 16, wherein controller:
adjusts the relative output of one of the at least two traction motors relative to the other to induce a relative speed differential between corresponding individual wheels associated with each of the two traction drive motors to facilitate turning of the vehicle.

* * * * *